(12) United States Patent
Martinotti et al.

(10) Patent No.: US 7,796,518 B2
(45) Date of Patent: Sep. 14, 2010

(54) TRAFFIC POLICING

(75) Inventors: Riccardo Martinotti, Savona (IT); Andrea Corti, Varazze (IT); Raoul Fiorone, Genoa (IT)

(73) Assignee: Ericsson AB, Stockholm (SE)

( * ) Notice: Subject to any disclaimer, the term of this patent is extended or adjusted under 35 U.S.C. 154(b) by 100 days.

(21) Appl. No.: 12/094,920

(22) PCT Filed: Nov. 23, 2006

(86) PCT No.: PCT/EP2006/068798

§ 371 (c)(1),
(2), (4) Date: Jun. 5, 2008

(87) PCT Pub. No.: WO2007/060191

PCT Pub. Date: May 31, 2007

(65) Prior Publication Data

US 2008/0298243 A1   Dec. 4, 2008

(30) Foreign Application Priority Data

Nov. 23, 2005  (IT) .......................... MI2005A2238

(51) Int. Cl.
*H04L 12/26* (2006.01)
*G06F 15/16* (2006.01)
(52) U.S. Cl. ...................................... 370/235; 709/235
(58) Field of Classification Search ........................ None
See application file for complete search history.

(56) References Cited

U.S. PATENT DOCUMENTS

| 6,970,426 | B1 * | 11/2005 | Haddock | 370/235.1 |
| 2002/0073226 | A1 * | 6/2002 | Sridhar et al. | 709/235 |
| 2004/0141462 | A1 * | 7/2004 | Mistry et al. | 370/229 |
| 2005/0135378 | A1 * | 6/2005 | Rabie et al. | 370/395.21 |

FOREIGN PATENT DOCUMENTS

WO   2004/066565   8/2004

OTHER PUBLICATIONS

Hui, Guo et al. "A Design and Evaluation of Ethernet Links Bundling Systems." 18th International Conference on Advanced Information Networking and Applications, 2004. Japan, Mar. 29-31, 2004. XP010695247, ISBN: 0-7695-2051-0.

* cited by examiner

*Primary Examiner*—Ricky Ngo
*Assistant Examiner*—Clemence Han
(74) *Attorney, Agent, or Firm*—Coats & Bennett, P.L.L.C.

(57) ABSTRACT

An apparatus and a method are described in which a flow of packets is distributed in several separate flows over several links (12) forming a logically aggregated link (11). The flow outgoing from each physical link is sent to its own policer (18) which applies to said flow a traffic policing algorithm with the policers being interconnected to exchange algorithm control parameter modification information to fit them in among the various policers while allowing for the control parameters of the others so that a distributed policer (15) is realized.

21 Claims, 1 Drawing Sheet

TRAFFIC POLICING

Figure 1:
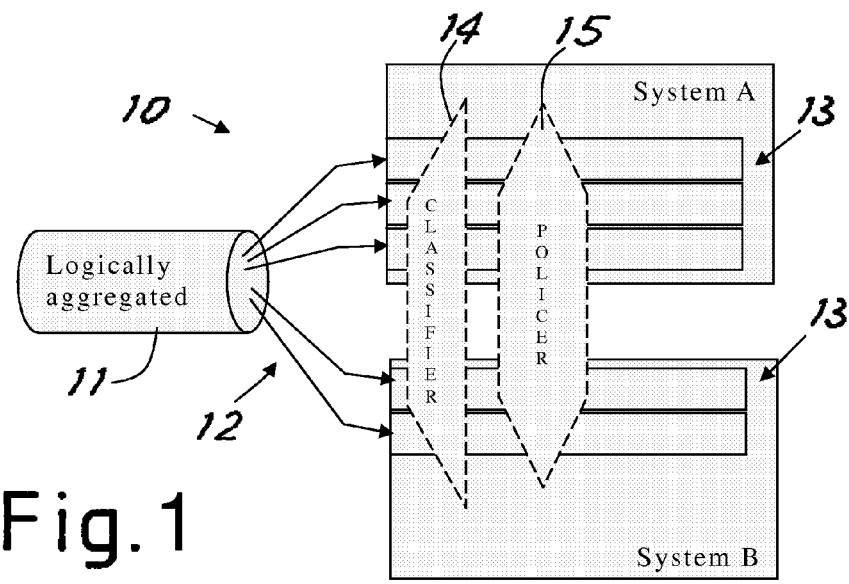

This invention relates to a packet transport method and apparatus for traffic policing.

Telecommunication networks carrying multiple different services, such as triple-play traffic, are necessarily required to support services with different requirements.

A network whose nodes have traffic control functionality allows sizing of transport services with a certain flow granularity. For this purpose a service contract (or Service Level Agreement (SLA)) is established between the users of the traffic and the network operator who provides the transport service. One of the important aspects of the contract is the specification of the make up of the traffic that will benefit from the service and how the service itself is to be performed; this is the traffic contract (or Service Level Specification (SLS)). The traffic contract provides a description of the traffic that will be served (or 'traffic description') and a description of the transport service (or Quality of Service (QoS) specification).

The purpose of the traffic contract in the preliminary step is to establish whether the service requirement can be met by the network, while in the delivery step that of operating an application of the served traffic contract (or 'traffic policing') depending on the description given by the user. Depending on the traffic contract, as long as the traffic sent in the network conforms to the description given, it has the right to the level of service required and granted.

Traffic policing is usually configured on the input interfaces of a network and allows evaluation of the conformity of the traffic received over an interface and partitioning of a network into multiple levels of priority or Class of Service (CoS). In addition, traffic policing performs measurement of the traffic profile (or 'metering') and possibly marking of the traffic packets so that the subsequent dropping of the traffic not conforming can be done on the basis of this marking.

In the most common traffic policing configurations, conforming traffic is transmitted and excess traffic is sent with decreasing priority or dropped. Users can change these configuration options to satisfy their network necessities.

Traffic transport utilizing logically aggregated links is well known. For example, standard IEEE802.3-2002 defines a functionality termed Link Aggregation (LA) where a logically aggregated link is made up of a number of physical links (for example, over Ethernet network links). This functionality can be used for a number of reasons, the most important of which are a functionality simplified from the viewpoint of the upper layers, logical bandwidth increase and a greater traffic protection capability.

More generally, link aggregation falls within the use of individual logical traffic entities, that is to say, the use of entities which for the upper layers of the network appear as a single entity, but which in reality use different physical ports (generically M in number) which reside on different traffic cards (generically N in number) which can also be supplied on different systems not even necessarily located in the same site.

In the prior art under these conditions traffic policing is performed on the individual traffic cards. This has been found to be unsatisfactory, especially when it is desired to observe an established QoS and/or utilize protection functionality on logically aggregated links.

The general purpose of this invention is to remedy the above-mentioned shortcomings by making available a packet transport method and apparatus with adaptive traffic policing more aware of the QoS and allowing realizing protection over logically aggregated links in an effective manner.

In view of this purpose it was sought to provide in accordance with this invention a method for application of global traffic policing for a flow of packets distributed in several separate flows over several links making up a logically aggregated link in which each separate flow is processed after classification by a policer of its own which applies to said flow a traffic policing algorithm exchanging information with the other policers in such a manner that the control parameters of the algorithm fit in among the various policers while allowing for the control parameters of the others.

Again in view of said purpose, it was sought to realized a traffic packet transport scheme in which a flow of packets is distributed in several separate flows over several links that form a logically aggregated link and in which the outgoing flow from each physical link is sent to a policer of its own that processes said flow with a traffic policing algorithm in accordance with this invention.

Figure 2:
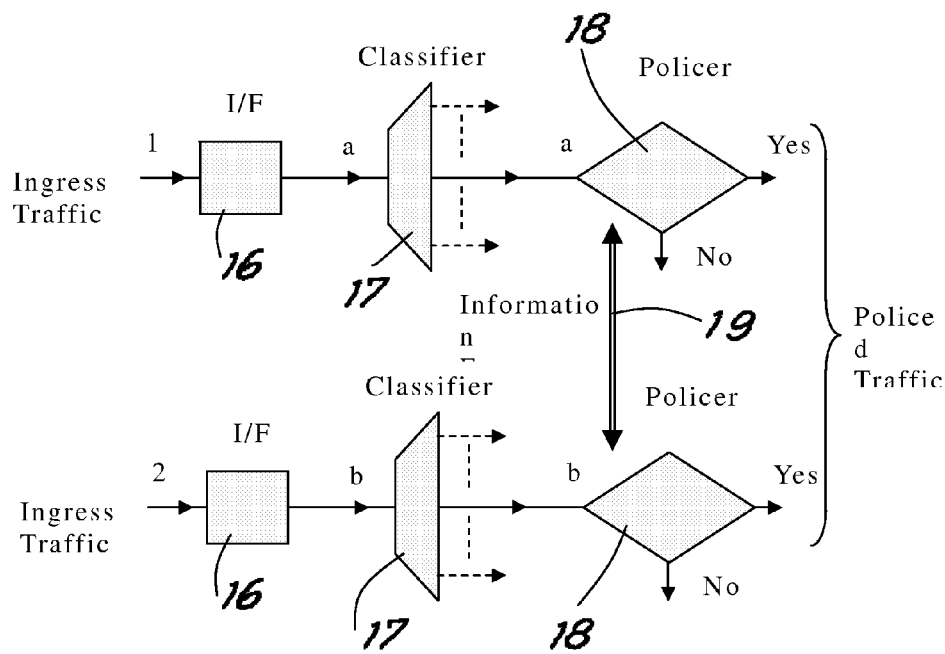
Figure 3:
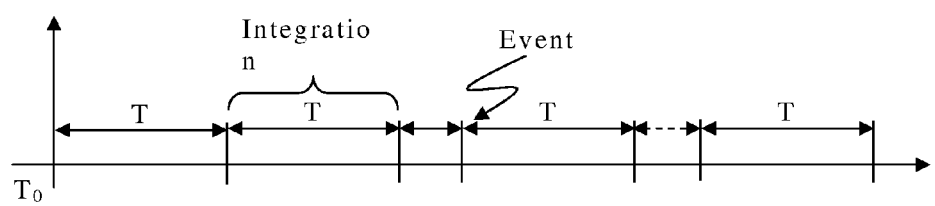

To clarify the explanation of the innovative principles of this invention and its advantages compared with the prior art there is described below with the aid of the annexed drawings a possible embodiment thereof by way of non-limiting example applying said principles. In the drawings:

FIG. 1 shows diagrammatically a point of arrival in a node of a logically aggregated link, FIG. 2 shows a functional scheme of the node of FIG. 1, and FIG. 3 shows a graph of the recalculation time of a possible policing algorithm.

With reference to the figures, FIG. 1 shows a reference scheme 10 of this invention. This scheme shows a logically aggregated link 11 (coming from the left-hand side of the figure), with the traffic being carried by the link needing to be classified and subjected to traffic policing. The logical link is made up of a plurality of mutually aggregated links 12 and connected to different physical ports which belong to different traffic cards 13 grouped in the more general case on different systems (in the example two systems designated by A and B).

In accordance with one aspect of this invention it is wished to provide a classifier 14 and a policer 15 on the flow arriving from the logically aggregated link. In accordance with the principles of this invention it is desired that there be awareness of the QoS and protection mechanisms aware of the QoS on the logically aggregated link.

There must therefore be provided a traffic policing function referred to the aggregated link 11 as a whole. But in reality each of the physical links forming the aggregated link arrives at its own separate interface port on a different card and it is therefore not possible to really realize a policer dealing with the logically aggregated link as a whole.

FIG. 2 shows the functional scheme applying the principles of this invention to obtain a distributed traffic policing on the cards. In accordance with this invention, the traffic policing is performed by the network processors on different cards. Each of the input links 12 reaches its respective interface 16 and the flows are then sent to corresponding policers 18 after being appropriately classified by means of classifiers 17.

The policers do not apply only rules based on local data but exchange information with each other in order to realize a self-adapting distributed policer as a whole. This distributed policer (made up of all the policers 18 with the appropriate information exchange connections 19) allows having a traffic policing that behaves like a single entity while adjusting parameters and behaviour depending on actual conditions (class of services, failure conditions, number of physical gates in the aggregated link, number of different cards et cetera).

FIG. 2 shows for the sake of simplicity two input flows 12 and two policers and reference is made below to this situation. But it is clear from the description given below of an application example of this invention how to apply this invention to a larger number of flows each with its own policer with information exchanges for realization of the distributed policer.

The two policers 18 are distinguished below by reference letters a and b.

The policing algorithm selected is for example the known Two Rate Three Color Marker. This is described by Internet RFC4115, available from http://www.ietf.org/rfc.html. In such a system, two leaky buckets are simulated. One bucket fills with "tokens" at a "committed information rate" (CIR) and the other at an "excess information rate" (EIR). The buckets each hold a limited number of tokens; in the case of the CIR bucket, this is the "committed burst size" (CBS) and for the EIR bucket the "excess burst size" limit. The buckets start full (i.e. with CBS/EBS tokens) but cannot hold more than their limits; no further tokens will be added over the relevant limit. Each of the EIR, CIR, EBS and CBS can be set for a given flow as desired.

Every time a packet is received, the size of the packet is determined and compared against the number of tokens in the buckets. In one implementation, if the packet size in bytes B is less than the number of tokens in the CIR bucket, then the packet is labelled green and B tokens are taken from the CIR bucket. If not, then B is compared to the number of tokens in the EIR bucket; if B is less than this number, the packet is labelled yellow and B tokens are taken from the EIR bucket. If neither bucket has sufficient tokens, then the packet is labelled red. Green packets are generally considered to comply with the user's bandwidth level, whilst yellow and red indicate increasing contravention; packets labelled such may be subject to delay or being dropped.

In the general case considered, the traffic parameters associated with the policer and derived from the SLS are indicated here by $\rho1$=CIR, $\rho2$=EIR, $\delta1$=CBS, $\delta2$=EBS. In accordance with this algorithm, a flow of packets is measured and the various packets are marked green, yellow or red depending on whether they conform or not to the bandwidth profile established by the SLS. However, in the case of a logical link, the flow is divided over the various aggregated physical links and the packets should therefore be marked in accordance with said rule while allowing for the flows over the various physical links.

The recalculation time of the algorithm is shown in FIG. 3. The measured values for each integration time T are the following:

MIRa=Mean Information Rate classified by the classifier 'a'

MIRb=Mean Information Rate classified by the classifier 'b'.

By exchange of the information, weights Wa and Wb are calculated and defined thereby as:

$Wa$=MIRa/(MIRa+MIRb)

$Wb$=MIRb/(MIRa+MIRb).

For each policer there are the conditions that:

$\delta1a \geq$ MTU_size; $\delta2a \geq$ MTU_size $\delta1b \geq$ MTU_size; $\delta2b \geq$ MTU_size where MTU_size is the Maximum Transfer Unit Size.

In the algorithm for exchange of information between policers, various behaviours can be held. If a conservative initial approach towards the equipment is preferred (that is to say, to save resources at the expense of maximum performance) it will be defined as initial parameters of the policers:

policer 'a': $\rho1a=\rho1/2$; $\rho2a=\rho2/2$; $\delta1a=\delta1/2$; $\delta2a=\delta2/2$ policer 'b': $\rho1b=\rho1/2$; $\rho2b=\rho2/2$; $\delta1b=\delta1/2$; $\delta2b=\delta2/2$ and the updating of the parameters after each integration time will be:

policer 'a': $\rho1a=\rho1\times Wa$; $\rho2a=\rho2\times Wa$; $\delta1a=\delta1\times Wa$; $\delta2a=\delta2\times Wa$ policer 'b': $\rho1b=\rho1\times Wb$; $\rho2b=\rho2\times Wb$; $\delta1b=\delta1\times Wb$; $\delta2b=\delta2\times Wb$.

But if an initial approach that wastes equipment but respects in any case the client's requirements, the following will be defined as initial parameters of the policers:

policer 'a': $\rho1a=\rho1$; $\rho2a=\rho2$; $\delta1a=\delta1$; $\delta2a=\delta2$ policer 'b': $\rho1b=\rho1$; $\rho2b=\rho2$; $\delta1b=\delta1$; $\delta2b=\delta2$ and the updating of the parameters after each integration time will be:

policer 'a': $\rho1a=\rho1\times Wa$; $\rho2a=\rho2\times Wa$; $\delta1a=\delta1$; $\delta2a=\delta2$ policer 'b': $\rho1b=\rho1\times Wb$; $\rho2b=\rho2\times Wb$; $\delta1b=\delta1$; $\delta2b=\delta2$.

The whole can be generalized for N policers as follows. The weight Wn for the $n^{th}$ policer will be:

$$Wn = \frac{MIRn}{\sum_{i=1}^{N} MIRi}$$

indicating with MIRn the MIR measured at each integration time for the $n^{th}$ policer (flow) and the summation being the sum of the MIR measured at each integration time for all the policers.

In the conservative approach, for the $n^{th}$ policer the initial parameters of $\rho1, \rho2, \delta1$ and $\delta2$ will be $\rho1_n=\rho1/N, \rho2_n=\rho2/N, \delta1_n\delta1/N$ and $\delta2_n=\delta2/N$, (that is to say, equally distributed among the policers) while the updating of the parameters after each integration time will be $\rho1_n=\rho1\times Wn, \rho2_n=\rho2\times Wn, \delta1_n=\delta1\times Wn$ and $\delta2_n=\delta2\times Wn$.

In the approach regarding the client in any case, for the $n^{th}$ policer the initial parameters of $\rho1, \rho2, \delta1$ and $\delta2$ will be $\rho1_n=\rho1, \rho2_n=\delta2, \delta2_n=2$ and $\delta2_n=\delta2$, while the updating of the parameters after each integration time will be $\rho1_n=\rho1\times Wn, \rho2_n=\rho2\times Wn, \delta1_n=\delta1$ and $\delta2_n=\delta2$.

It is now clear that the preset purposes have been achieved. Basically, information is exchanged between the policers so that the control parameters for the algorithm that manages the local traffic policing of each policer fits in among the various policers while allowing for the control parameters of the other policers.

The information exchange mechanism among policers is described below.

After each integration period T (possibly reduced because of an event, as may be seen in FIG. 3) each policer sends to all the other policers involved in the aggregation a message containing its own MIRn. The integration period T must be as short as possible but long enough to allow sending and receiving of all the messages between one period and the next. In the case where a policer does not receive within the integration period the MIRn figure of one or more of the other policers involved in the aggregation, it will consider these values equal to zero (this approach, given as an example, is conservative; other approaches can be defined). The transmission of electronic messages between the policers uses control channels designed purposely and realizable either inside one apparatus or between different apparatus, channels that are not subject to further definition within the scope of the patent right claimed here.

Said scheme adjusts to various policing algorithms as for example the known Two Rate Three Color Marker as defined by the Internet Engineering Task Force (IETF), in which case the traffic parameters become ρ1=PIR (Peak Information Rate), ρ2=CIR (Committed Information Rate), δ1=PBS (Peak Burst Size), δ2=CBS (Committed Burst Size), or to the algorithm as defined by the MEF (Metro Ethernet Forum), in which case the traffic parameters become ρ1=CIR, ρ2=EIR (Excess Information Rate), and δ1=CBS, δ2=EBS (Excess Burst Size).

In this manner, the traffic policing function, which is performed by the network processors on different cards, behaves like a single entity, satisfying through information exchange in the algorithm the need to adjust parameters and behaviour depending on the real conditions (class of services, failure conditions, number of physical gates in the aggregated link, number of different cards et cetera). There is thus awareness of the QoS and protection mechanisms aware of the QoS on the logically aggregated link.

Naturally the above description of an embodiment applying the innovative principles of this invention is given by way of non-limiting example of said principles within the scope of the exclusive right claimed here. For example, as mentioned above, from the example given, application of this invention to any number of flows and policers is immediate.

The invention claimed is:

1. A method of policing a flow of packets distributed in multiple separate flows on multiple links aggregated to form a logical communications link, the method comprising:
   classifying incoming packets in each of a plurality of separate packet flows output by a logical link;
   policing each of the classified packet flows at a corresponding number of policers according to a predetermined policing algorithm; and
   exchanging information between the plurality of policers such that control parameters of the policing algorithm are applied among the policers, such that each policer considers the control parameters of other policers, and wherein exchanging information between the plurality of policers comprises, at each integration time, each policer sending its own Mean Information Rate (MIRn) measured at the integration time to all of the other policers; and
   a first policer assigning an MIRn=0 to a second policer if the first policer does not receive the MIRn from the second policer within an integration period T.

2. The method of claim 1 wherein the information exchanged by the policers includes at least one of an overall data rate through a given policer, and a data rate for a given class of service through a given policer.

3. The method of claim 1 wherein the predetermined policing algorithm is a Two Rate Three Color Marker algorithm.

4. The method of claim 1 wherein for each flow separated by the $n^{th}$ policer of N policers, the method further comprises calculating a weight using:

$$Wn = \frac{MIRn}{\sum_{i=1}^{N} MIRi}$$

where MIRn is equal to a Mean Information Rate measured at each integration time for the $n^{th}$ policer, and the summation is the sum of the MIR measured at each integration time for all N policers.

5. The method of claim 4 wherein each of the policers has defined global traffic parameters ρ1, ρ2, δ1, δ2 derived from the Service Level Specification (SLS).

6. The method of claim 5 wherein:
   the initial parameters of the algorithm for each policer are defined as $\rho1_n=\rho1/N, \rho2_n=\rho2/N, \delta1_n=\delta1/N, \delta2_n\delta2/N$; and the parameters after being updated at each integration time are defined as $\rho1_n=\rho1\times Wn, \rho2_n=\rho2\times Wn, \delta1_n=\delta1$ and $\delta2_n=\delta2$.

7. The method of claim 4 wherein:
   the initial parameters of the algorithm for each policer are defined as $\rho1_n=\rho1, \rho2_n=\rho2, \delta1_n=\delta1, \delta2_n\delta2$; and the parameters after being updated at each integration time are defined as $\rho1_n=\rho1\times Wn, \rho2_n=\rho2\times Wn, \delta1_n=\delta1$ and $\delta2_n=\delta2$.

8. The method of claim 5 wherein the global traffic parameters for the distributed flow are ρ1=Peak Information Rate, ρ2=Committed Information Rate, δ1=Peak Burst Size, and δ2=Committed Burst Size.

9. The method of claim 5 wherein the global traffic parameters for the distributed flow are ρ1=Committed Information Rate, ρ2=Excess Information Rate, δ1=Committed Burst Size, δ2=Excess Burst Size.

10. A packet information transport apparatus comprising:
    a logical communications link comprising a plurality of aggregated physical links, the logical link configured to carry flows of packets distributed across the physical links; and
    a plurality of interconnected policers, each policer associated with a corresponding physical link and configured to,
       receive an outgoing flow of packets from its corresponding physical link;
       process the received flow of packets according to a predetermined policing algorithm having one or more control parameters; and
       exchange information with the other policers such that each policer is configured to modify its control parameters based on the information received from the other policers, and wherein each policer is configured to exchange information at each integration time by sending a message that comprises its own Mean Information Rate (MIRn) measured at each integration time to all other policers; and
    wherein a first policer is configured to assign an MIRn=0 to a second policer if the first policer does not receive the MIRn of the second policer within an integration period T.

11. The apparatus of claim 10 wherein the information exchanged by the policers includes at least one of an overall data rate through a given policer, and a data rate for a given class of service through a given policer.

12. The apparatus of claim 10 wherein for each separate packet flow received at an $n^{th}$ policer, the $n^{th}$ policer is configured to calculate a weight using:

$$Wn = \frac{MIRn}{\sum_{i=1}^{N} MIRi}$$

where MIRn is equal to a Mean Information Rate measured at each integration time for the $n^{th}$ policer, and wherein the summation is the sum of the MIR measured at each integration time for all N policers.

13. The apparatus of claim 12 wherein the predetermined policing algorithm applied by the policers to their corresponding packet flows has defined global traffic parameters $\rho1, \rho2, \delta1, \delta2$ derived from the Service Level Specification (SLS).

14. The apparatus of claim 13 wherein:
the initial parameters of for each policer are defined as $\rho1_n = \rho1/N, \rho2_n = \rho2/N, \delta1_n = \delta1/N, \delta2_n = \delta2/N$; and the parameters after being updated at each integration time are defined as $\rho1_n = \rho1 \times Wn, \rho2_n = \rho2 \times Wn, \delta1_n = \delta1$ and $\delta2_n = \delta2$.

15. The apparatus of claim 13 wherein:
the initial parameters of for each policer are defined as $\rho1_n = \rho1, \rho2_n = \rho2, \delta1_n = \delta1, \delta2_n = \delta2$; and the parameters after being updated at each integration time are defined as $\rho1_n = \rho1 \times Wn, \rho2_n = \rho2 \times Wn, \delta1_n = \delta1$ and $\delta2_n = \delta2$.

16. The apparatus of claim 13 wherein the global traffic parameters for the distributed flow are $\rho1$=Peak Information Rate, $\rho2$=Committed Information Rate, $\delta1$=Peak Burst Size, and $\delta2$=Committed Burst Size.

17. The apparatus of claim 13 wherein the global traffic parameters for the distributed flow are $\rho1$=Committed Information Rate, $\rho2$=Excess Information Rate, $\delta1$=Committed Burst Size, $\delta2$=Excess Burst Size.

18. The apparatus of claim 10 wherein the predetermined policing algorithm applied at a given policer is a Two Rate Three Color Marker algorithm.

19. The apparatus of claim 10 further comprising a packet classifier interposed between the logical link and the policers.

20. The apparatus of claim 10 wherein each policer is implemented on a separate card and is configured to process a corresponding incoming packet flow carried over a physical link.

21. The apparatus of claim 10 wherein two or more cards are disposed on distinct network equipment, so that they can be located in physically remote nodes.

* * * * *

UNITED STATES PATENT AND TRADEMARK OFFICE
CERTIFICATE OF CORRECTION

PATENT NO. : 7,796,518 B2  Page 1 of 1
APPLICATION NO. : 12/094920
DATED : September 14, 2010
INVENTOR(S) : Martinotti et al.

It is certified that error appears in the above-identified patent and that said Letters Patent is hereby corrected as shown below:

In Column 4, Line 49, delete "$\delta1_n\delta1/N$" and insert -- $\delta1_n=\delta1/N$ --, therefor.

In Column 4, Line 55, delete "$\rho2_n=\delta2,$" and insert -- $\rho2_n=\rho2,$ --, therefor.

In Column 4, Line 55, delete "$\delta2_n=2$" and insert -- $\delta1_n=\delta1$ --, therefor.

In Column 6, Line 21, in Claim 6, delete "$\delta2_n\delta2/N;$" and insert -- $\delta2_n=\delta2/N;$ --, therefor.

In Column 6, Line 30, in Claim 7, delete "$\delta2_n\delta2;$" and insert -- $\delta2_n=\delta2;$ --, therefor.

In Column 7, Line 25, in Claim 14, after "parameters" delete "of".

In Column 8, Line 2, in Claim 15, after "parameters" delete "of".

In Column 8, Line 26, in Claim 21, delete "10" and insert -- 20 --, therefor.

Signed and Sealed this
Fourth Day of October, 2011

David J. Kappos
*Director of the United States Patent and Trademark Office*